United States Patent
Schmid et al.

(10) Patent No.: US 12,467,992 B1
(45) Date of Patent: Nov. 11, 2025

(54) NMR APPARATUS WITH FLEXIBLE SAMPLE TRANSPORT TUBE

(71) Applicant: Bruker Switzerland AG, Fällanden (CH)

(72) Inventors: Reto Schmid, Winterthur (CH); Sven Sieber, Seegräben (CH)

(*) Notice: Subject to any disclaimer, the term of this patent is extended or adjusted under 35 U.S.C. 154(b) by 0 days.

(21) Appl. No.: 19/259,619

(22) Filed: Jul. 3, 2025

(51) Int. Cl.
G01R 33/30 (2006.01)
G01R 33/46 (2006.01)

(52) U.S. Cl.
CPC .......... G01R 33/307 (2013.01); G01R 33/46 (2013.01)

(58) Field of Classification Search
CPC .............................. G01R 33/307; G01R 33/46
See application file for complete search history.

(56) References Cited

U.S. PATENT DOCUMENTS

| | | |
|---|---|---|
| 4,859,948 A | 8/1989 | Kuster |
| 8,217,655 B2 | 7/2012 | De Vries et al. |
| 9,726,735 B2 | 8/2017 | Schmidig et al. |
| 9,903,923 B2 | 2/2018 | Schett et al. |
| 10,782,369 B2 | 9/2020 | Schmid et al. |
| 11,073,583 B2 | 7/2021 | Meister et al. |
| 11,231,471 B2 | 1/2022 | Bangemann et al. |
| 2010/0109666 A1* | 5/2010 | Armbruster ............ G01R 33/34 324/318 |
| 2015/0198681 A1 | 7/2015 | Chintalapati |
| 2024/0069129 A1 | 2/2024 | Endo |

FOREIGN PATENT DOCUMENTS

| | | |
|---|---|---|
| DE | 3729819 | 11/1991 |
| JP | 2006-234539 | 9/2006 |

OTHER PUBLICATIONS

Bruker Sample Transport. BST Installation and Technical Manual Version 002, Bruker BioSpin AG, Nov. 21, 2008.

* cited by examiner

*Primary Examiner* — G.M. A Hyder
(74) *Attorney, Agent, or Firm* — Benoît & Côté Inc.

(57) ABSTRACT

An NMR spectrometer having an NMR magnet system which is mounted on a device for isolating the vibrations of the NMR magnet system from the environment includes a sample storage means for providing and temporarily storing NMR measurement samples to be measured, and a transport device for transporting one NMR measurement sample at a time from the sample storage means to a measurement volume within the NMR magnet system. The transport device comprises a continuous, pneumatically bidirectionally operable, gastight transport tube that is mechanically flexibly constructed from a plurality of interconnected sub-elements in the form of separate rigid tube sections that can move relative to one another and are dimensionally stable relative to a flow cross-section of the transport tube. This allows a passive mechanical decoupling from the NMR magnet system, without the need to actively monitor the position of the NMR magnet system relative to the sample storage means.

14 Claims, 4 Drawing Sheets

NMR APPARATUS WITH FLEXIBLE SAMPLE TRANSPORT TUBE

BACKGROUND OF THE INVENTION

Field of the Invention

The invention relates to an NMR spectrometer comprising an NMR magnet system, which is mounted on a device for isolating the vibrations of the NMR magnet system from the environment, comprising a sample storage means for providing and temporarily storing a plurality of NMR measurement samples to be measured and comprising a transport device for transporting one NMR measurement sample at a time from the sample storage means into a measurement volume within the NMR magnet system, wherein the transport device comprises a continuous, pneumatically bidirectionally operable gastight transport tube. NMR spectrometers comprising such transport devices are known from U.S. Pat. No. 8,217,655 B2 or from U.S. Pat. No. 10,782,369 B2.

Description of the Related Art

NMR spectrometers with pneumatically operated transport devices have been manufactured and marketed by the applicant for many decades. They are, for example, described in DE 37 29 819 C2.

A transport device for pneumatically transporting the NMR measuring samples is known from the company brochure "Bruker Sample Transport. BST Installation and Technical Manual Version 002" by Bruker BioSpin AG, Nov. 21, 2008, particularly from Sections 2, 3, and 5.7-5.9 of this publication. In the following, such a transport device is abbreviated as "BST."

For more than half a century, NMR methods have been used to quickly and accurately analyze the chemical composition of measuring samples or to determine the structure of substances contained in the samples. These can be performed in NMR spectrometers. NMR spectrometers suitable for these purposes are also described, for example, in U.S. Pat. No. 8,217,655, 10,782,369 B2 and DE 37 29 819 C2 cited above.

NMR spectroscopy is a powerful method of instrumental analysis. In these NMR methods, the sample is exposed to a strong static magnetic field $B_0$ in a z direction. This leads to an interaction with the nuclear spins of the sample material, in particular to the alignment of nuclear spins in the measuring substance. For this purpose, orthogonal high-frequency electromagnetic pulses are then radiated into the sample in the x or y direction. The development of these nuclear spins of the sample over time in turn produces high-frequency electromagnetic fields, which are detected in the NMR apparatus. Information regarding the properties of the sample are integrally obtainable from the detected HF fields over a certain spatial region. It is particularly possible to deduce the chemical composition and the chemical bonding conditions in the sample from the position and intensity of NMR lines.

The measurement sample usually consists of a cylindrical sample tube having a cross-section that is typically circular, oval or rectangular, which contains the solid or liquid measuring substance. The sample tube is sealed at least at the end that first enters the probe head of the NMR spectrometer and is typically located in a transport container, the so-called spinner. Sample tubes and spinners containing the NMR measurement sample are transported from outside the magnet into the probe head using the transport system. The references cited above describe a transport means for transporting such an NMR measurement sample between an input point where it can be inserted into and removed from the transport means, and a feed point where—in the case of an NMR spectrometer having a superconductive magnet system—the sample tube can be fed to a room-temperature tube of a cryostat, wherein the input point is spaced both horizontally and vertically from the feed point, and wherein a tubular transport channel is provided for pneumatically transporting the sample tube from a first transfer point at the upper end of the transport tube to a second transfer point at its lower end.

In the following, it is assumed that the insertion opening is at the top of the probe head of the NMR spectrometer and the NMR measurement sample is therefore inserted into the probe head from above. However, it is also conceivable to introduce the sample tube into the probe head from below into an opening provided for this purpose. This case is analogous to the above-mentioned case and, for reasons of clarity, shall not be described in detail herein. Once the NMR measurement sample is in the measuring position, the spinner will be inside a turbine. This turbine makes it possible for the sample tube to rotate (see, for example, U.S. Pat. No. 9,726,735 B2).

U.S. Pat. No. 9,903,923 B2 discloses a transport device for transporting an NMR sample to the probe head of an NMR spectrometer. The transport device comprises a transport container for the sample having a specially modified latching means. The transport container is designed to be usable for transporting not only an HR-NMR sample spinner with a sample tube inserted therein but also an NMR MAS rotor. In this way, it is possible to quickly switch between NMR spectroscopy for liquids to NMR spectroscopy for solids, and vice versa, by simply changing the probe head, without having to modify the transport system.

In general, the dead time between two consecutive measurements in the NMR system should be as short as possible. It should therefore be possible to switch the NMR measurement samples as quickly as possible. A suitable automatable, compact quick-change system having a sensor device for detecting a transport container and special parking receptacles for temporarily storing a transport container arriving at the spectrometer is proposed in U.S. Pat. No. 11,073,583 B2.

JP 2006-234539 A discloses an NMR apparatus having a superconductive NMR magnet system in a cryostat, which is mechanically decoupled from the environment to minimize vibrations. The sample is introduced into the NMR measurement volume via a funnel-shaped arrangement. The NMR measurement samples are taken from a reservoir that is spatially outside where the vibrations are decoupled and is arranged next to the actual NMR apparatus, and are then transported via an air gap to the NMR measurement volume in a transport device rigidly connected to the NMR apparatus. Any offset between the reservoir and the cryostat is actively monitored by means of a sensor system. The disadvantage of this means is that the transport device is rigidly connected to the NMR apparatus and transmits vibrations to an NMR measurement sample when the latter is transported.

A similar NMR apparatus is disclosed in U.S. Pat. No. 11,231,471 B2, in which a funnel-shaped arrangement likewise receives NMR measurement samples from a reservoir positioned outside the vibration-isolation zone of the actual NMR apparatus. Pneumatic transport of the NMR measurement samples into the cryostat of the NMR apparatus is not provided here.

US 2015/0198681 A1 in turn describes an NMR apparatus having a cryostat. Here, NMR measurement samples are pneumatically transported via a rigid vertical transport tube from a sample storage means, which is not mechanically decoupled from the cryostat or the NMR magnet system, to a pick-up point above the cryostat.

US 2024/0069129 A1 also discloses an NMR spectrometer in which NMR measurement samples are pneumatically transported into the measurement region through a rigid tube. However, no information is provided about mechanical decoupling of the NMR apparatus from the environment.

In U.S. Pat. No. 8,217,655 B2 (cited above), NMR measurement samples are pneumatically transported via a rigid transport tube into the measurement volume within a cryostat containing the NMR magnet system, the vibrations of the latter being isolated from its surroundings. The sample storage means is not mechanically decoupled from the cryostat in this case but rigidly connected thereto. The NMR apparatus according to 10,782,369 B2 (also cited above) displays a similar design without mechanical decoupling of the sample storage means from the NMR magnet system, with a double-tube system being used in 10,782,369 B2 for controlling the position of the transported material more effectively.

As already mentioned above, in order to minimize vibrations the cryostats of NMR systems are usually mechanically decoupled from building vibrations by pneumatic dampers. However, this makes the automatic transport of NMR samples to be measured fundamentally more difficult.

The solution currently marketed by the applicant, which uses a rigid, pneumatic transport tube, requires rigid mechanical coupling between the sample storage means and the NMR apparatus, in particular to the cryostat when using superconducting magnet systems. This severely limits the size, weight and design of the sample storage means. The movement of the NMR measurement samples in the sample storage means during an NMR measurement can severely disturb the latter.

If the NMR measurement sample is to be further transported to a mechanically decoupled robot, this robot must be able to at least compensate for a mechanical offset in prior-art NMR apparatuses.

SUMMARY OF THE INVENTION

In contrast with the prior art, the present invention is directed to modifying an NMR spectrometer comprising a transport device of the type described above by using the simplest possible technical measures so as to completely or at least largely avoid the disadvantages listed above without reducing the quality of the NMR measurements, wherein the NMR apparatus is intended to remain particularly compact and any additional material costs and further manufacturing costs remain insignificant.

In particular, the invention makes possible a passive mechanical decoupling of the NMR magnet system isolated from vibrations without the need to actively monitor the position of the NMR magnet system relative to the sample storage means by means of sensors or to readjust any offset by means of actuators during operation of the transport device.

The modification of a known transport device according to the invention can also be used without major modifications for existing systems according to the prior art, for example for the applicant's "SampleJet" and "SampleCase".

According to the invention, in an NMR spectrometer of the type in question, the transport tube is gastight but is constructed mechanically flexibly, in particular in all three spatial directions, from a plurality of interconnected sub-members in the form of separate rigid tube sections, which can move relative to one another and are dimensionally stable with respect to the flow cross-section of the transport tube.

The movable, mechanically flexible tube is composed of various sub-members (pieces). The transition points between these sub-members are designed to be gastight or airtight in order to pneumatically move the NMR measurement sample to be transported. The flexible tube allows transport by means of pneumatic negative pressure or overpressure. However, absolute tightness—as in vacuum systems, for example—is not absolutely necessary for this.

The flexible transport tube designed according to the invention can compensate for mechanical displacement relative to a sample storage means without making the transported material (NMR measurement sample) accessible from the outside, for example, which would otherwise pose a hazard to users of the NMR apparatus.

The present invention, due to its flexible design, makes it possible to overcome without major effort the action threshold normally always present in arrangements according to the prior art, from the fixed building to the damped, movable NMR magnet system (or the cryostat of superconductive NMR magnets). This achieves passive, mechanical movement and vibration decoupling of the sample storage means from the NMR magnet system.

This also makes it possible to design completely new NMR automation solutions, among other things.

Overall, a very robust, gentle and yet particularly fast transport of the NMR measurement sample can be achieved without the need for special monitoring and closed-loop control of the relative movements between the sample storage means and NMR magnet system in particular by means of sensors.

Since the transport device according to the invention only makes passive vibration isolation possible, and no active monitoring or readjustment functions are required, there are also significantly fewer malfunctions during operation and no special maintenance measures need to be provided.

Precisely because of the possibilities opened up by the invention for improved automatic rapid feeding of NMR measurement samples—ideally perhaps even temperature-controlled beforehand—it is possible to keep the NMR measurement cycle very short. Shortening the measurement cycle results in great economic benefits when more measurements can be carried out in the same time.

At this point it should be expressly pointed out that the advantages of the invention are achievable not only with vertical NMR spectrometers but also with NMR systems with a horizontal or inclined z axis. The axial positions specified then no longer necessarily have to be "above" or "below" the NMR magnet coil system but instead may also be "to the right" or "to the left" thereof. In any case, gravity then only plays a minor role in the operation of the present invention.

The scope of the present invention also includes a transport device having a gastight transport tube for the pneumatic transport of NMR measurement samples from a sample storage means into a measurement volume within the NMR magnet system of an NMR spectrometer of the type according to the invention described above. According to the present invention, this transport device is characterized in that the sub-members of the transport tube are designed such that even in the event of axial displacement or tilting of immediately adjacent sub-members relative to one another, radially inner portions of the hollow sub-members, in particular radially inner edges, do not protrude into the clear flow cross-section inside the transport tube through which the NMR measurement samples are to be pneumatically transported.

This ensures that the NMR measurement samples do not get stuck or caught on such obstructions as they are transported through the tube. Nevertheless, the transition points allow a defined mobility of adjacent sub-members relative to one another. These are precisely radially aligned relative to one another.

In particularly advantageous developments of this class of embodiments of the invention, the sub-members of the transport tube each have, in their end portion with which they connect to an immediately adjacent sub-member, the shape of either a positive or a negative ball joint segment. Each positive ball joint segment engages precisely in the negative ball joint segment of the adjacent sub-member in such a way that the two ball joint segments in question abut one another surface-to-surface and exert a sufficient sealing function between the clear flow cross-section of the transport tube and its outer side in the transition region between the two ball joint segments.

These functions are achieved by releasing the airtightness and transition edge clearance at different radial distances from the axis of each sub-member. On an outer radius, a ball joint ensures that the members can move without the gas used for transport (usually air) escaping.

By simply converting the ball joint into a sliding guide, the mobility can also allow a longitudinal extension of the transition points. In this way, the required defined mobility of adjacent sub-members relative to one another can be achieved in a simple and technically inexpensive way.

In advantageous variants of these developments, in addition to the positive or negative ball joint segments in the end portions of the sub-members with which they connect to immediately adjacent sub-members, there are also cylindrical partial surfaces which are preferably in particular part of the negative ball joint segments.

This also allows axial movements of the sub-members relative to one another. A further advantageous development comprises conical partial surfaces on one side in the transition regions of the sub-members, which, when engaging with a cylindrical counter-surface in the adjacent sub-member, limit the degree of tilting of the sub-members relative to one another.

Very advantageous are embodiments of the transport device according to the invention in which the sub-members have a meshing toothed structure in an inner region of the transition points between adjacent sub-members, an outer surface of which is conical.

On an inner radius, these teeth, which are adapted to the transported material, ensure that no axial edges are created.

The teeth should be designed in such a way that the pressure under the NMR measurement sample does not decrease by ensuring that the height of the teeth is not greater than the sealing guide length of the transported material.

Furthermore, the toothed structure prevents adjacent sub-members from twisting relative to one another, which is advantageous when attaching lines to the outside of the transport tube.

Further preferred embodiments of the invention are characterized in that the transport tube is designed in the region of the transition points between adjacent sub-members in such a way that, due to the geometry of each of the sub-members, the degree of relative angular movement possible between the two adjacent sub-members is limited so that it is not possible to fall below a predeterminable minimum radius of curvature of the transport tube, which could otherwise block the transported material. In particular, the maximum degree of tilting of adjacent sub-members (16') is between 0.1° and 5°, particularly 0.5°.

Further advantageous embodiments of the invention are characterized in that the transport tube is designed in the region of the transition points between adjacent sub-members in such a way that longitudinal extensions in the longitudinal direction of the transport tube can also be compensated for.

Since the NMR magnet system can move vertically on the damping elements of the vibration-isolation device, the possible longitudinal extension of the transport tube in this way is useful.

Preference is also given to an embodiment of the transport device according to the invention in which at least some of the sub-members of the transport tube are identical.

This makes possible, among other things, a particularly cost-effective yet highly accurate and, in particular, geometrically extremely precise production of the individual sub-members. As a rule, the sub-members in particular will require relatively tight manufacturing tolerances in order to ensure that the function (tightness, mobility, fit) is reproducible. In addition, the individual sub-members of the flexible transport tube can sometimes have complex designs, which can then only be manufactured conventionally (e.g., by machining) to a limited extent.

Furthermore, a class of embodiments of the invention is also advantageous in which, in order to change the flexural behavior along the transport tube, the transport tube contains sub-members whose length and/or different freedom of movement differ(s).

The flexible tube according to the invention can also be combined with existing rigid transport tubes used in an existing NMR apparatus in order to be able to easily bridge longer distances.

The start and end positions of the flexible transport tube require sub-members having a separate design (especially without the special movable interface) in order to be able to transfer the transported material to rigid system components.

The flexible transport tube can be designed so that the individual members can be assembled in either a defined or undefined rotational orientation.

In further embodiments, the transport device according to the invention is designed such that sealing means, in particular flexible sealing compound or O-rings, are arranged in the transition region between immediately adjacent sub-members of the transport tube.

In practice, embodiments are likely to prove successful in which the sub-members of the transport tube are designed in such a way that the transport tube can be repeatedly disassembled and reassembled without tools, in particular for transport, maintenance, repair and cleaning and/or for adjusting the length of the transport tube. This can be achieved, for example, by the sub-members being made, at least in the transition region, of an elastic material, in particular plastic, such that they elastically deform when joined or separated and can therefore also be easily mounted or removed without tools.

In particular, the flexible transport tube can be disassembled for delivery to the user of the NMR apparatus. This eliminates the need for bulky packaging for long tubes.

Also advantageous are embodiments of the transport device according to the invention in which at least some sub-members of the transport tube have closable radial openings in order to control the pneumatic gas flow and thus to be able to influence the pneumatic transport behavior along the transport tube.

For example, it may be desirable to reduce the speed of the NMR measurement sample before it enters the NMR probe head and therefore to leave the radial openings open in this portion.

Depending on the specific application, embodiments of the transport device according to the invention, in which at least some sub-members of the transport tube are constructed entirely or partially from transparent material so that the NMR measurement sample remains visible from the outside at least at points on its way from the sample storage means to the measurement volume and back again, can be particularly beneficial.

It may also be advantageous if, in embodiments of the transport device according to the invention, the transport tube is made of or coated with electrically conductive material in order to prevent electrostatic charges.

Embodiments are also possible in which at least some sub-members of the transport tube are designed as hose portions, preferably having an internal and/or external support structure, in order to ensure the defined inner diameter even at curved points. The hose portions and the support structure are designed such that each of the sub-members of the transport tube is rigid.

In advantageous embodiments, the transport tube of the transport device according to the invention can have a cable duct and/or hose guide on its radial outer side.

Finally, a class of embodiments of the transport device according to the invention is particularly preferred which is characterized in that the transport tube has fastening elements for fastening it to parts of the NMR spectrometer and/or for coupling a plurality of transport tubes to one another at the same time.

This allows individual elements to be connected to other mechanical parts of the NMR spectrometer and/or a plurality of flexible tubes to be coupled to one another at the same time.

Further advantages of the invention are found in the description and the drawing. Likewise, the features mentioned above and those explained further can be used according to the invention either individually or collectively in any combination. The embodiments shown and described are not to be understood as an exhaustive list, but rather have an exemplary character for the description of the invention.

BRIEF DESCRIPTION OF THE DRAWINGS

The invention is illustrated in the drawings and will be explained in more detail with reference to embodiments.

FIG. 2b is an enlarged detailed view of the lower end of the lowest sub-member of the transport device in FIG. 2a.

DETAILED DESCRIPTION

In general, the present invention relates to a modified device for transporting NMR measurement samples to and from an NMR spectrometer 10. The advantages of the invention can also be used in a spectrometer with a different physical measurement technology, in which case, appropriate suitable modifications must be made.

Figure 1:
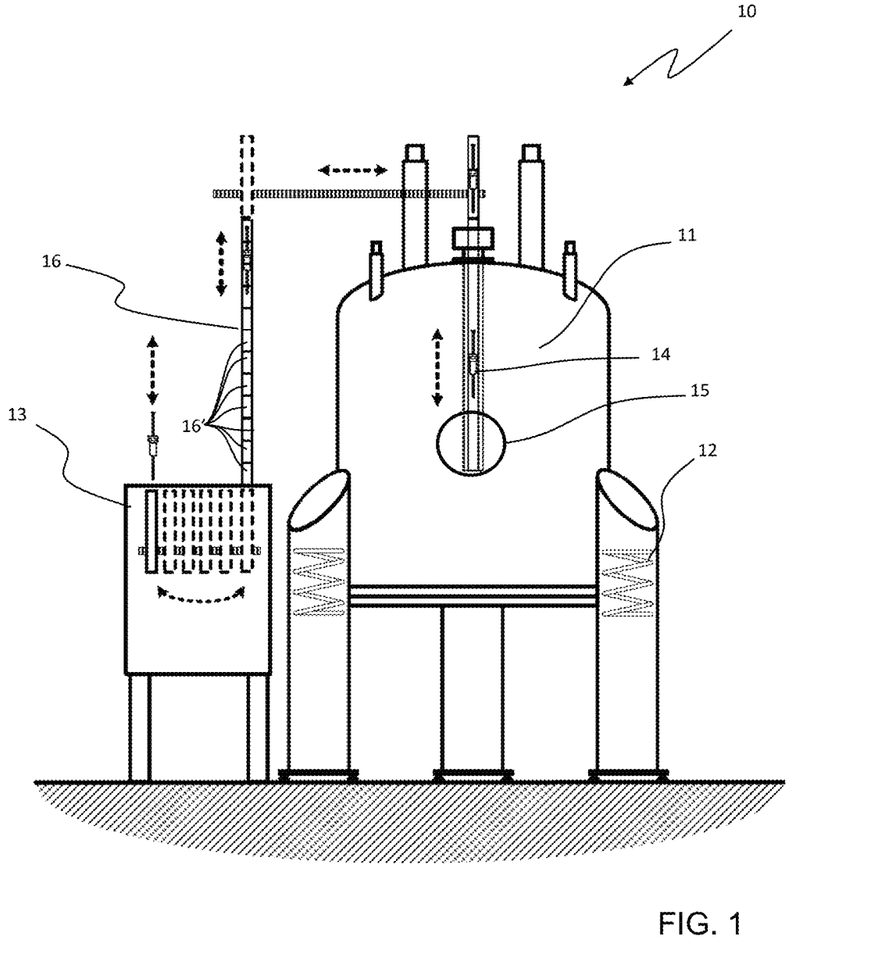
FIG. 1 is a schematic, partially transparent, lateral vertical sectional view of an embodiment of the NMR spectrometer according to the present invention comprising a transport device modified according to the invention.

As shown in FIG. 1, the NMR spectrometer 10 is equipped with an NMR magnet system 11, which is mounted on a device 12 for vibration decoupling the NMR magnet system from the environment, with a sample storage means 13 for providing and temporarily storing NMR measurement samples 14 to be measured and with the transport device for transporting one NMR measurement sample 14 each time from the sample storage means 13 into a measurement volume 15 within the NMR magnet system 11, wherein the transport device comprises a continuous, pneumatically bidirectionally operable gastight transport tube 16.

As a rule, a means for generating overpressure or negative pressure is also provided in the end of the tubular transport channel remote from the NMR spectrometer, but this is not shown in the drawings for the sake of clarity.

The NMR spectrometer 10 according to the invention and its transport device are characterized in that the transport tube 16, despite being gastight, is mechanically flexibly constructed—in particular in all three spatial directions—of a plurality of interconnected sub-members 16' in the form of separate rigid, interconnecting tube sections that can move with respect to one another and are dimensionally stable with respect to the flow cross-section of the transport tube 16.

The sub-members 16' of the transport tube 16 are designed such that even in the event of axial displacement or tilting of immediately adjacent sub-members 16' relative to one another, radially inner portions of the hollow sub-members 16', in particular radially inner edges, do not protrude into the clear flow cross-section inside the transport tube 16 through which the NMR measurement samples 14 are to be pneumatically transported.

Figure 2A:
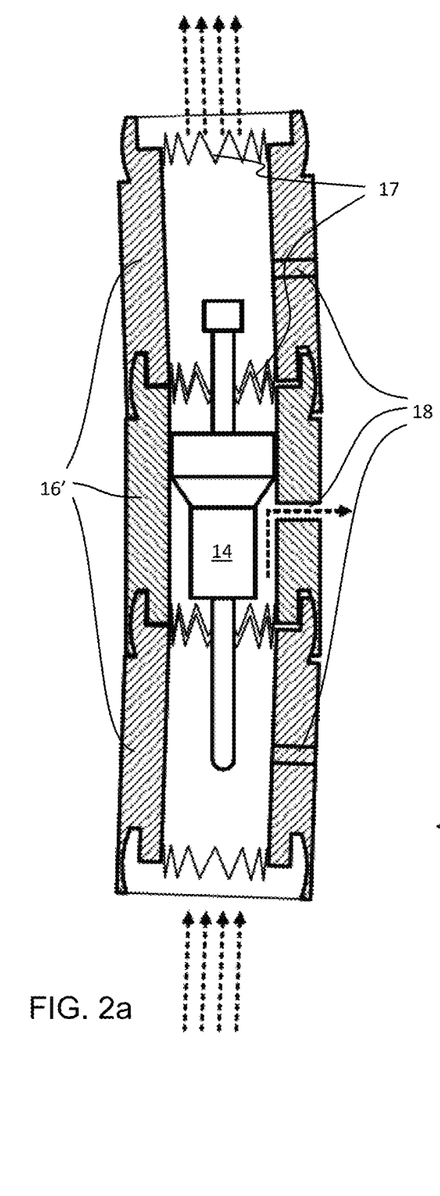
FIG. 2a is a schematic vertical sectional view of an embodiment of the transport device according to the invention with three assembled sub-members and an NMR measurement sample moved therein by a gas stream.

FIG. 2a schematically shows an embodiment of the transport device according to the invention comprising—for the sake of clarity—only three assembled sub-members 16' and an NMR measurement sample 14 that is moved therein by a gas stream-indicated by dashed arrows. In reality, however, the transport device will be composed of significantly more sub-members 16'.

Preferably, the sub-members 16' of the transport device according to the invention have a length of 20 mm to 100 mm, particularly preferably of about 50 mm. The outer diameter is preferably in the range between 30 mm and 50 mm, particularly preferably is about 40 mm. The inner diameter of the sub-members 16' is preferably in a range of from 20 mm to 40 mm, particularly preferably 26.2 mm. Typical NMR sample holders have a maximum diameter of 26 mm and, together with the sample tubes fastened therein, a length of 20.32 cm (equivalent to 8 inches). The maximum degree of tilting of the sub-members 16' is preferably in the range between 0.1° and 5°, particularly preferably about 0.5°. During use, the transport device according to the invention is preferably exposed to a dynamic pressure of 100 mbar to 500 mbar, particularly preferably about 300 mbar.

The sub-members 16' of the transport tube 16 each have, in their end portion with which they connect to an immediately adjacent sub-member 16', either the shape of a positive or a negative ball joint segment, wherein the positive ball joint segment engages precisely in the negative ball joint segment of the adjacent sub-member 16' in each case such that the two ball joint segments in question lie against one another surface-to-surface and exert a sealing function between the clear flow cross-section of the transport tube 16 and its outer side in the transition region between the two ball joint segments.

In addition, the sub-members 16' have a meshing toothed structure 17 in an inner region of the transition points between adjacent sub-members 16', an outer surface of which toothed structure is conical.

The transport tube 16 is designed in the region of the transition points between adjacent sub-members 16' such that, due to the geometry of each sub-member 16', the degree of possible relative movement between the two adjacent sub-members 16' is limited, and therefore it is not possible to fall below a predeterminable minimum radius of curvature of the transport tube 16.

Furthermore, the transport tube 16 is designed in the region of the transition points between adjacent sub-members 16' in such a way that longitudinal extensions in the longitudinal direction of the transport tube 16 can also be compensated for.

At least some sub-members 16' of the transport tube 16 have closable radial openings 18 through which a small portion of the gas stream moving the NMR measurement sample 14 can escape.

Figure 2B:
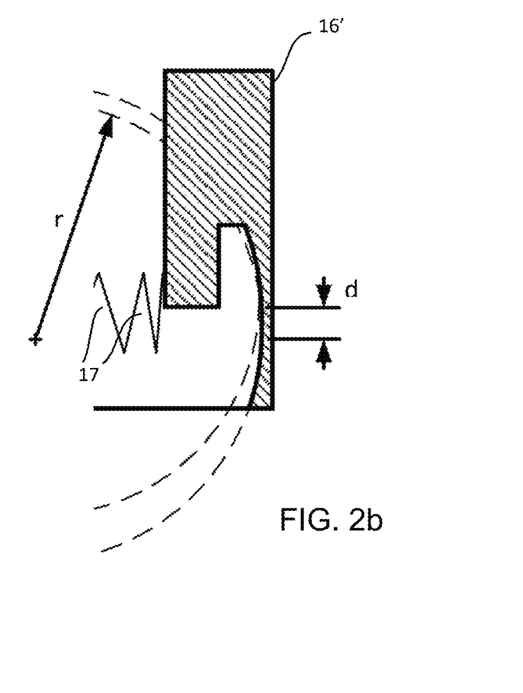

FIG. 2b shows an enlarged detailed view of the lower end of a sub-member 16' of the transport device in FIG. 2a.

The drawing illustrates that, in addition to the positive or negative ball joint segments in the end portions of the sub-members 16' with which they connect to immediately adjacent sub-members 16', there may also be cylindrical partial surfaces which are part of the negative ball joint segments. These cylindrical partial surfaces in an "elongated spherical shape" can be imagined, for example, as being created by a linear offset by a distance d of two identical spherical surfaces having a radius r.

The geometric name for such an overall shape is "spherocylinder" or "capsule". In the embodiment according to FIG. 2b, this would then be a "spherocylinder segment" or a "capsule segment", since the axial ends are cut off. This design ensures that adjacent sub-members 16' can be tilted with respect to one another and at the same time longitudinal extension can take place.

Figure 3:
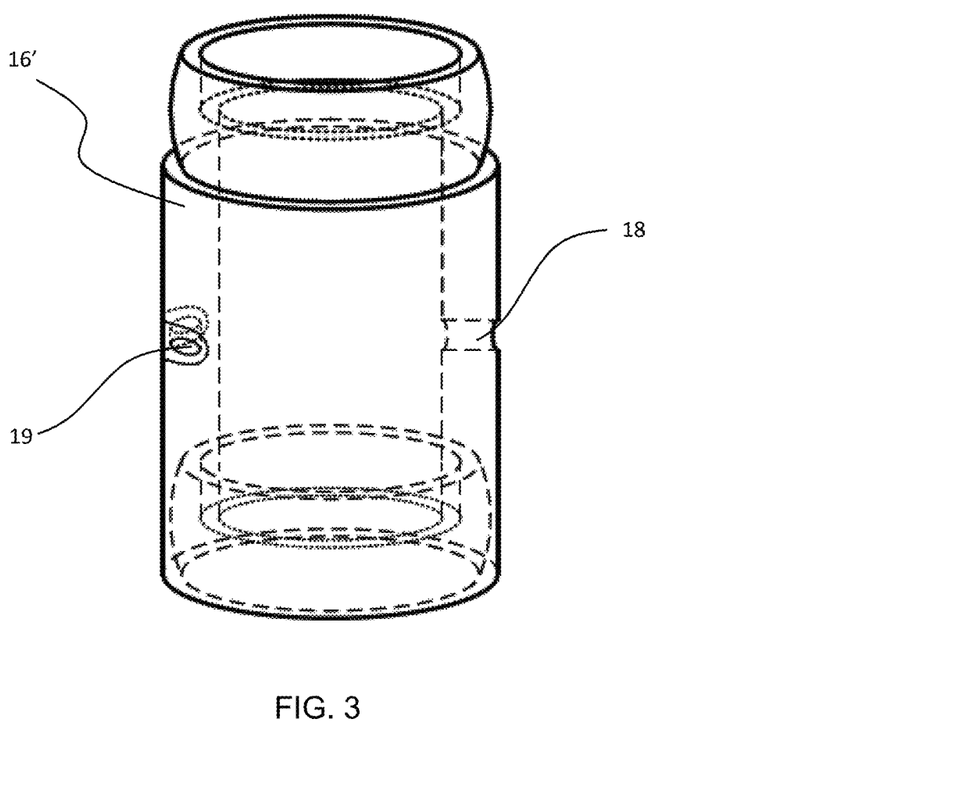
FIG. 3 is a partially transparent, schematic spatial view of an embodiment of a sub-member of the transport device modified according to the invention.

FIG. 3 is a partially transparent schematic spatial view of an embodiment of an individual sub-member 16' of the transport device according to the invention. In particular, it shows a positive ball joint segment on the top side and a negative one on the bottom side of the sub-member 16'.

The transport tube 16 and, in particular, individual sub-members 16' thereof can have fastening elements 19 for fastening to parts of the NMR spectrometer 10 and/or for coupling a plurality of transport tubes 16 to one another at the same time.

Finally, FIGS. 4a to 4d are intended to illustrate the basic function of interlocking ball joint segments (FIG. 4a), cylindrical surfaces (FIG. 4b), conical surfaces (FIG. 4c) and toothed rings (FIG. 4d) in the region where in each case two sub-members of the transport tube according to the invention are coupled. As a rule, several or even all of these four aspects are always realized in specific embodiments. However, this is hardly possible to represent graphically (see FIG. 2b, for example). For this reason, the four functions are explained individually below.

Figure 4A:
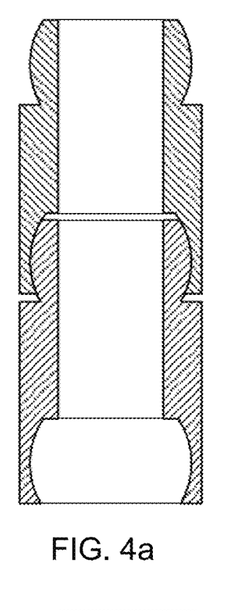
FIG. 4a is the first of four schematic vertical sectional views of different aspects of the design of the region where the sub-members overlap.

FIG. 4a Functions: Snap lock, angular movement and sealing—This illustration shows the (pure) ball joint, which can be snapped together. For this to be possible, the element must be deformable in the lower region. A plastic used must allow this deformation without being damaged. Once these parts are inserted into one another, the ball joint allows an angular movement. However, during this angular movement, no further deformation of the material occurs. Furthermore, the ball joint also serves as a seal to prevent drive gas, usually air, from escaping at this point.

Figure 4B:
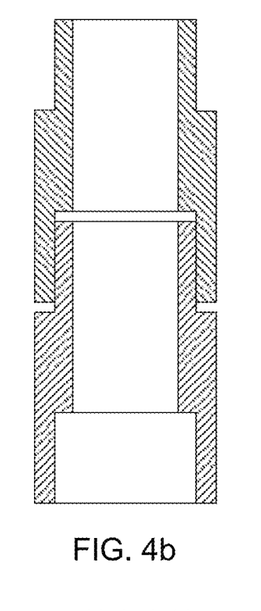
FIG. 4b is the second of four schematic vertical sectional views of different aspects of the design of the region where the sub-members overlap.

FIG. 4b Function: Longitudinal extension—Only the cylindrical region of the coupling is highlighted here. This cylindrical region allows displacement along the axis. It should also be noted that here, too, this shape prevents any drive gas from being able to escape from the central hole.

Figure 4C:
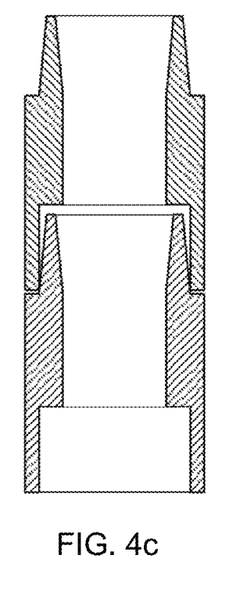
FIG. 4c is the third of four schematic vertical sectional views of different aspects of the design of the region where the sub-members overlap.

FIG. 4c Function: Angle limitation—In order to limit the angle of the ball joint despite possible longitudinal extension, angle limitation in the form of a cone versus a cylinder must be provided. The maximum angle between the elements is therefore always the same, regardless of the longitudinal extension.

Figure 4D:
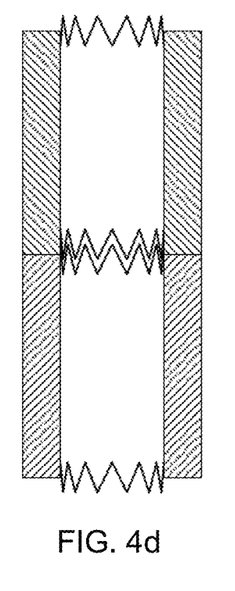
FIG. 4d is the fourth of four schematic vertical sectional views of different aspects of the design of the region where the sub-members overlap.

FIG. 4d Function: Removal of edges—To prevent disturbing radial edges from occurring on the inside of the elements of the transport device according to the invention, the transition points have a sawtooth shape. These teeth create an angle between the transition edges between the elements and the edges of the transported goods. This creates gaps on the inside over the height of the teeth (approx. 9 mm high in the current development) and the teeth must therefore not be higher than the guide length of the transported material (in reality approx. 13 mm). If these teeth were higher than the guide length of the transported goods, the drive gas would flow past the transported material through the gaps created instead of driving it forward.

In further embodiments of the invention, the transport tube 16 can contain sub-members 16' whose length and/or freedom of movement differ(s). As a rule, however, at least some of the sub-members 16' of the transport tube 16 will be identical.

The sub-members 16' of the transport tube 16 will be designed such that the transport tube 16 can be repeatedly disassembled and reassembled without any tools, in particular for transport, maintenance, repair and cleaning and/or for adjusting the length of the transport tube 16.

At least some sub-members 16' of the transport tube 16 may be constructed entirely or partially from transparent material so that it is possible to see from the outside where an NMR measurement sample is located.

In addition, the transport tube 16 should be made of or be coated with electrically conductive material. This prevents, or at least reduces, electrostatic charging of the transport device.

Finally, in other embodiments, at least some sub-members 16' of the transport tube 16 can be designed as hose sections, preferably having an internal and/or external support structure.

LIST OF REFERENCE SIGNS

10 NMR spectrometer
11 NMR magnet system
12 Vibration-isolation device
13 Sample storage means
14 NMR measurement sample
15 Measurement volume
16 Transport tube
16' Sub-member
17 Toothed structure
18 Radial openings
19 Fastening elements

The invention claimed is:

1. An NMR spectrometer comprising:
 an NMR magnet system mounted on a device for isolating vibrations of the NMR magnet system from the environment;
 a sample storage means for providing and temporarily storing NMR measurement samples to be measured; and
 a transport device for transporting an NMR measurement sample from the sample storage means into a measurement volume within the NMR magnet system, the transport device comprising a continuous, pneumatically bidirectionally operable, gastight transport tube that is mechanically flexibly constructed from a plurality of interconnected sub-members in the form of separate rigid tube sections, which can move relative to one another and are dimensionally stable with respect to a flow cross-section of the transport tube.

2. A transport device for the pneumatic transport of NMR measurement samples from a sample storage means into a measurement volume within an NMR magnet system of an NMR spectrometer, comprising a continuous, pneumatically bidirectionally operable, gastight transport tube that is mechanically flexibly constructed from a plurality of interconnected sub-members in the form of separate rigid tube sections, which can move relative to one another and are dimensionally stable with respect to a flow cross-section of the transport tube, wherein the sub-members of the transport tube are configured such that, in the event of any axial displacement or tilting of immediately adjacent sub-members relative to one another, radially inner portions of the sub-members do not project into a clear flow cross-section in the interior of the transport tube through which the NMR measurement samples are pneumatically transported.

3. The transport device according to claim 2, wherein each of the sub-members of the transport tube have, in an end portion with which they connect to an immediately adjacent sub-member, a shape of either a positive or a negative ball joint segment, the positive ball joint segment precisely engaging in the negative ball joint segment of the adjacent sub-member such that the positive and negative ball joint segments abut each other surface-to-surface and exert a sealing function between the clear flow cross-section of the transport tube and an external environment in a transition region of the two ball joint segments.

4. The transport device according to claim 3, further comprising cylindrical partial surfaces that are part of the ball joint segments.

5. The transport device according to claim 2, wherein the sub-members comprise, in an inner region of transition points between adjacent sub-members, a meshing toothed structure, an outer surface of which is conical.

6. The transport device according to claim 2, wherein the transport tube is configured such that, at transition points between adjacent sub-members, a degree of relative movement possible between the two adjacent sub-members is limited so as to establish a minimum radius of curvature of the transport tube.

7. The transport device according to claim 2, wherein the transport tube is configured such that transition points between adjacent sub-members allow for linear extensions in a longitudinal direction of the transport tube and can compensate for a mechanical offset of the NMR spectrometer.

8. The transport device according to claim 2, wherein at least some of the sub-members of the transport tube are identical.

9. The transport device according to claim 2, wherein the transport tube comprises sub-members whose lengths and/or relative freedom of movement differ.

10. The transport device according to claim 2, wherein the sub-members of the transport tube are configured to permit the transport tube to be repeatedly disassembled and reassembled without tools.

11. The transport device according to claim 2, wherein at least some sub-members of the transport tube have closable radial openings.

12. The transport device according to claim 2, wherein at least some sub-members of the transport tube are constructed entirely or partially from optically transparent material.

13. The transport device according to claim 2, wherein the transport tube is constructed entirely or partially from electrically conductive material or is coated with such a material.

14. The transport device according to claim 2, wherein the transport tube comprises fastening elements for fastening it to parts of the NMR spectrometer and/or for coupling a plurality of transport tubes to one another at the same time.

* * * * *

UNITED STATES PATENT AND TRADEMARK OFFICE
CERTIFICATE OF CORRECTION

PATENT NO. : 12,467,992 B1
APPLICATION NO. : 19/259619
DATED : November 11, 2025
INVENTOR(S) : Reto Schmid and Sven Sieber Page 1 of 1

It is certified that error appears in the above-identified patent and that said Letters Patent is hereby corrected as shown below:

On the Title Page

The missing foreign application priority data is to be added:
(30) Foreign Application Priority Data
July 11, 2024 (DE) ......................102024206558.7

Signed and Sealed this
Sixteenth Day of December, 2025

John A. Squires
*Director of the United States Patent and Trademark Office*